(12) United States Patent
Waugh et al.

(10) Patent No.: US 10,802,969 B2
(45) Date of Patent: Oct. 13, 2020

(54) INTERCONNECT AND METHOD OF OPERATION OF SUCH AN INTERCONNECT

(71) Applicant: Arm Limited, Cambridge (GB)

(72) Inventors: Alex James Waugh, Cambridge (GB); Geoffray Matthieu Lacourba, Nice (FR)

(73) Assignee: Arm Limited, Cambridge (GB)

( * ) Notice: Subject to any disclaimer, the term of this patent is extended or adjusted under 35 U.S.C. 154(b) by 75 days.

(21) Appl. No.: 16/266,185

(22) Filed: Feb. 4, 2019

(65) Prior Publication Data

US 2020/0250094 A1 Aug. 6, 2020

(51) Int. Cl.
| | | |
|---|---|---|
| *G06F 12/0815* | (2016.01) | |
| *H04L 12/747* | (2013.01) | |
| *G06F 12/0862* | (2016.01) | |
| *G06F 12/0811* | (2016.01) | |

(52) U.S. Cl.
CPC ...... *G06F 12/0815* (2013.01); *G06F 12/0811* (2013.01); *G06F 12/0862* (2013.01); *H04L 45/742* (2013.01); *G06F 2212/621* (2013.01)

(58) Field of Classification Search
CPC ......... H04L 29/06; H04L 45/00; H04L 45/22; H04L 45/04; H04L 67/2814; H04L 67/2847; H04L 67/2842; G06F 3/067; G06F 3/0635; G06F 3/0629; G06F 3/0646; G06F 3/0647; G06F 3/065; G06F 3/0656; G06F 3/0655; G06F 9/3802
USPC .................. 370/400; 709/211, 218, 239, 242; 711/138, 141–143
See application file for complete search history.

(56) References Cited

U.S. PATENT DOCUMENTS

| | | | | |
|---|---|---|---|---|
| 7,496,068 B2* | 2/2009 | Chen | ....................... | H04L 29/06 370/329 |
| 2008/0104329 A1* | 5/2008 | Gaither | ............... | G06F 12/0888 711/138 |

(Continued)

*Primary Examiner* — William E. Baughman
(74) *Attorney, Agent, or Firm* — Nixon & Vanderhye P.C.

(57) ABSTRACT

An interconnect, and method of operation of such an interconnect, are disclosed. The interconnect has a plurality of nodes, and a routing network via which information is routed between the plurality of nodes. The plurality of nodes comprises at least one slave node used to couple master devices to the interconnect, at least one master node used to couple slave devices to the interconnect, and at least one control node. Each control node is responsive to a slave node request received via the routing network from a slave node, to perform an operation to service the slave node request and, when a propagation condition is present, to issue a control node request via the routing network to a chosen master node in order to service the slave node request. The chosen master node processes the control node request in order to generate a master node response, and treats as a default destination for the master node response the control node that issued the control node request. In response to a trigger event occurring after the control node request has been issued, the control node sends an update destination request to the chosen master node that identifies a replacement destination node for the master node response. At least in the absence of an override condition, the chosen master node then sends the master node response via the routing network to the replacement destination node.

19 Claims, 11 Drawing Sheets

(56) References Cited

U.S. PATENT DOCUMENTS

| | | | |
|---|---|---|---|
| 2015/0244705 A1* | 8/2015 | Flamini | G06F 21/41 726/8 |
| 2016/0321179 A1* | 11/2016 | Sara | G06F 12/0831 |
| 2017/0277709 A1* | 9/2017 | Strauss | G06F 3/0631 |

* cited by examiner

INTERCONNECT AND METHOD OF OPERATION OF SUCH AN INTERCONNECT

BACKGROUND

The present technique relates to an interconnect, and to a method of operation of such an interconnect.

An interconnect may be formed from a plurality of nodes, and a routing network via which information may be routed between those nodes. The nodes may comprise one or more slave nodes used to couple master devices to the interconnect, one or more master nodes used to couple slave devices to the interconnect, and one or more control nodes. When a request is issued by a master device to its associated slave node of the interconnect, then that request may be routed to a control node that is arranged to perform an operation to seek to service that request. In at least some instances it may then be necessary for the request to be propagated on from the control node via a master node to an appropriate slave device, to cause that slave device to perform an operation in order to service the original request.

In modern interconnects, there can be a significant volume of traffic passing between the various nodes via the routing network of the interconnect. It is hence important to make efficient utilisation of the available bandwidth within the routing network, and is also important to seek to reduce the latency of the interconnect in order to improve the performance of a system that incorporates that interconnect.

SUMMARY

In one example arrangement, there is provided an interconnect comprising: a plurality of nodes; a routing network via which information is routed between the plurality of nodes; the plurality of nodes comprising at least one slave node used to couple master devices to the interconnect, at least one master node used to couple slave devices to the interconnect, and at least one control node; wherein each control node is responsive to a slave node request received via the routing network from a slave node, to perform an operation to service the slave node request and, when a propagation condition is present, to issue a control node request via the routing network to a chosen master node in order to service the slave node request; the chosen master node being arranged to process the control node request in order to generate a master node response, and to treat as a default destination node for the master node response the control node that issued the control node request; the control node being responsive to a trigger event occurring after the control node request has been issued, to send an update destination request to the chosen master node, the update destination request identifying a replacement destination node for the master node response; and the chosen master node being responsive to the update destination request, at least in the absence of an override condition, to send the master node response via the routing network to the replacement destination node.

In another example arrangement, there is provided a method of operating an interconnect that has a plurality of nodes and a routing network via which information is routed between the plurality of nodes, comprising: providing within the plurality of nodes at least one slave node used to couple master devices to the interconnect, at least one master node used to couple slave devices to the interconnect, and at least one control node; causing each control node to be responsive to a slave node request received via the routing network from a slave node, to perform an operation to service the slave node request and, when a propagation condition is present, to issue a control node request via the routing network to a chosen master node in order to service the slave node request; processing the control node request at the chosen master node in order to generate a master node response, and treating as a default destination node for the master node response the control node that issued the control node request; responsive to a trigger event occurring after the control node request has been issued, sending from the control node an update destination request to the chosen master node, the update destination request identifying a replacement destination node for the master node response; and responsive to the update destination request, at least in the absence of an override condition, sending from the chosen master node the master node response via the routing network to the replacement destination node.

In a still further example arrangement, there is provided an interconnect comprising: a plurality of node means; a routing network means via which information is routed between the plurality of node means; the plurality of node means comprising at least one slave node means for coupling master devices to the interconnect, at least one master node means for coupling slave devices to the interconnect, and at least one control node means; wherein each control node means is responsive to a slave node request received via the routing network means from a slave node means, for performing an operation to service the slave node request and, when a propagation condition is present, for issuing a control node request via the routing network means to a chosen master node means in order to service the slave node request; the chosen master node means for processing the control node request in order to generate a master node response, and for treating as a default destination node means for the master node response the control node means that issued the control node request; the control node means, responsive to a trigger event occurring after the control node request has been issued, for sending an update destination request to the chosen master node means, the update destination request identifying a replacement destination node means for the master node response; and the chosen master node means, responsive to the update destination request, at least in the absence of an override condition, for sending the master node response via the routing network means to the replacement destination node means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1A:
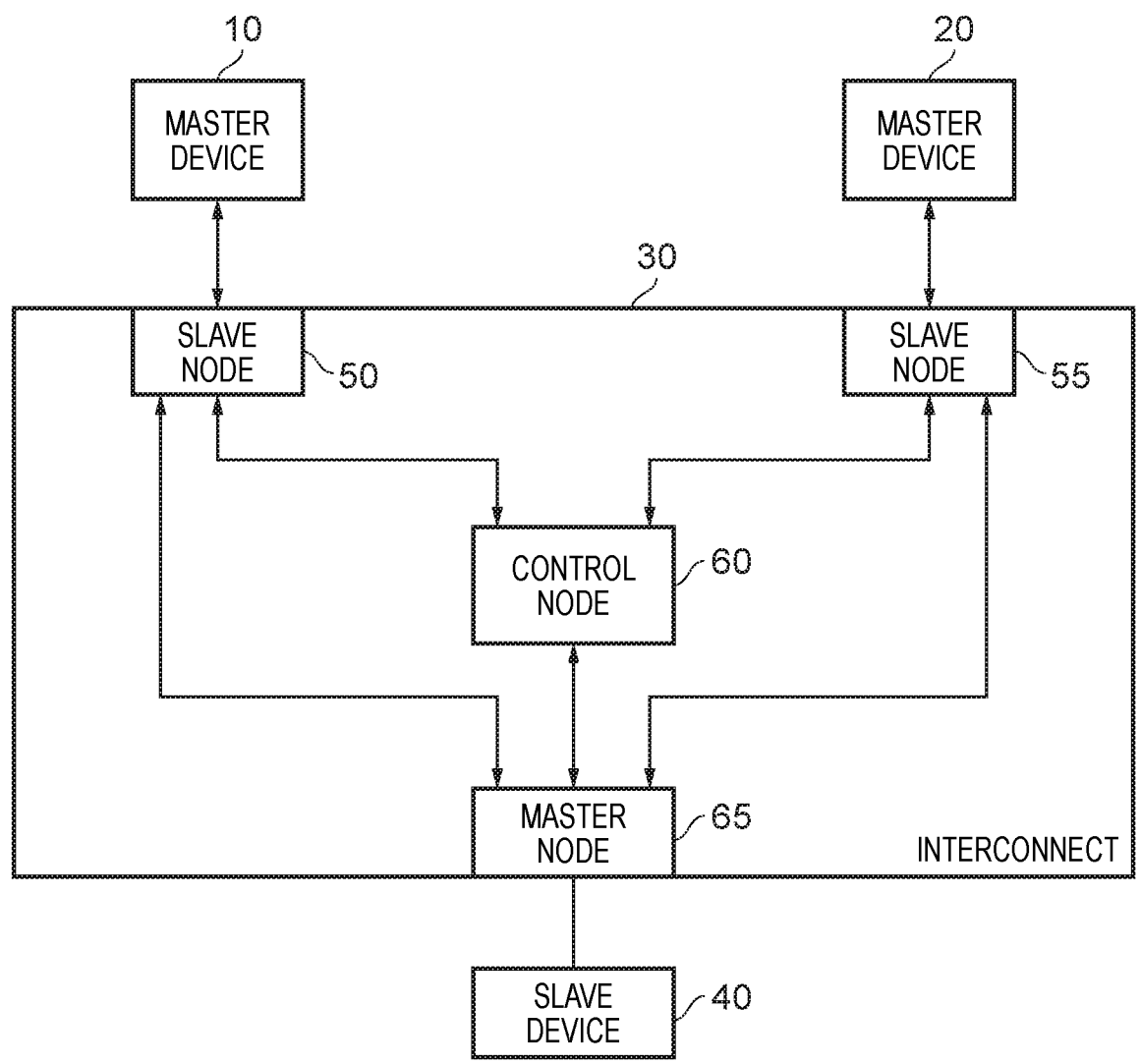
FIG. 1A is a diagram schematically illustrating an interconnect in accordance with one example arrangement.

In accordance with the techniques described herein, an interconnect comprises a plurality of nodes, and a routing network via which information is routed between the plurality of nodes. The plurality of nodes comprises at least one slave node used to couple master devices to the interconnect, at least one master node used to couple slave devices to the interconnect, and at least one control node.

Each control node is arranged to be responsive to a slave node request received via the routing network from a slave node, to perform an operation to service the slave node request. Further, when a propagation condition is present, the control node issues a control node request via the routing network to a chosen master node in order to service the slave node request. The propagation condition can take a variety of forms, depending on the form of the control node. For example, the control node may take the form of a cache structure used to cache data for access by one or more of the master devices connected to the interconnect via their associated slave nodes. In such instances, the slave node request received from a slave node may identify a data access request issued by the master device connected to that slave node. If the item of data identified by that request (for example by specifying a memory address for that data) is not already stored within the cache structure, then the propagation condition will be determined to be present, and result in the issuance of a control node request to a master node that couples the interconnect to a lower level in the memory hierarchy, for example a lower level of cache and/or main memory.

As another example, the control node may take the form of cache coherency circuitry, used to ensure coherency in the data cached within multiple caches of the system containing the interconnect. For instance, multiple master devices may each have local caches in which they can cache data, and the cache coherency circuitry will ensure that those cached copies remain coherent with each other. However, not all of the master devices within the system that can cache data may be connected directly to the interconnect, and instead at least some of those master devices may be coupled via one or more further interconnect structures accessible via a master node of the interconnect. In such instances, the propagation condition will be present when it is determined appropriate to perform a cache coherency operation in respect of one or more of those master devices that are not directly connected to the interconnect, in which case a cache coherency request will be issued to the relevant master node for onward propagation via the one or more further interconnect structures.

Irrespective of the form of control node used, the chosen master node is arranged to process the control node request in order to generate a master node response. Typically this will involve the master node communicating with one or more components external to the interconnect in order to obtain responses from those components that can be used to generate the master node response. The chosen master node will treat, as a default destination node for the master node response, the control node that issued the control node request.

However, the control node is responsive to a trigger event occurring after the control node request has been issued, to send an update destination request to the chosen master node, that update destination request identifying a replacement destination node for the master node response. The chosen master node is then responsive to the update destination request, at least in the absence of an override condition, to send the master node response via the routing network to the replacement destination node.

Hence, after the control node request has been issued by the control node, if a trigger event is subsequently detected, the control node can seek to alter the destination node for the master node response associated with that control node request. This can cause significant reductions in latency within the system, and in some instances can improve the efficiency of utilisation of the available bandwidth within the routing network.

In one example implementation, the chosen master node may always be arranged to respond to the update destination request so as to alter the destination to which the master node response is sent. However, in another example implementation, the chosen master node is arranged to check for the presence of an override condition, and in the presence of the override condition can be arranged to ignore the update destination request, and instead to send the master node response to the default destination node, i.e. the control node that issued the control node request. The override condition can take a variety of forms, and indeed multiple different override conditions can be checked for by the chosen master node when determining whether to act upon the update destination request or not.

The replacement destination node can take a variety of forms, but in one example implementation is the slave node that issued the original slave node request that caused the control node to issue the control node request. Hence, when the control node detects the presence of a trigger event, it can issue the update destination request with the aim of causing the master node response to be provided directly back to the originating slave node, without needing to be routed back via the control node itself. This can significantly reduce latency. Further, in some instances it can improve the efficiency of utilisation of the available bandwidth, for instance by enabling different requests to be merged, for example where the control node was processing a prefetch request which was then matched with a subsequent demand request from the master device, allowing the response that will be generated for the prefetch request to be used directly to form the response for the demand request.

In one example arrangement, in the absence of the update destination request, the chosen master node is arranged to send the master node response via the routing network to the control node that issued the control node request, and the control node is then responsive to receipt of the master node response to issue a control node response via the routing network to the slave node that issued the slave node request. However, in the presence of the update destination request, at least in the absence of the override condition, the chosen master node may be arranged to send the master node response via the routing network to the slave node that issued the slave node request, bypassing the control node. Hence, when the control node detects presence of the trigger event, it can seek to cause the destination node to be updated so as to enable the response to be returned directly to the originating slave node, in order to reduce latency and/or improve efficient utilisation of the available bandwidth within the routing network.

In one example implementation, when the chosen master nodes accepts the update destination request, and accordingly in due course sends the master node response to the replacement destination node, it could also be arranged to send the master node response to the control node if that were considered appropriate. For example, if the control node is a cache structure, and it is still considered appropriate for the data to be cached in that cache structure even though it has been provided directly back to the requesting master device via its slave node, then the response can be propagated to both the slave node and the control node.

However, in one example implementation, the chosen master node is arranged, when sending the master node response to the replacement destination node, to inhibit also sending the master node response to the control node. This can enable a reduction in network traffic within the interconnect, and also avoid unnecessary communications. For example, considering the earlier cache based example of a control node, it may be that the cache structure formed by the control node is arranged to operate in an exclusive manner with regards to any caching structures associated with the requesting master device, and accordingly when the data is being provided directly back to the master device via its slave node, for caching within a local cache at the master device, that data will not be cached within the control node structure, and accordingly there is no need to provide the data back to the control node.

In one example implementation where the master node response is not returned to the control node, and instead is solely provided to the replacement destination node, the chosen master node may be arranged to notify the control node that the master node response has been sent to the replacement destination node. This enables the control node to determine that its request has been handled, and allows it to update its tracking structures accordingly.

In one example implementation, the chosen master node is responsive to the update destination request to perform an override condition check procedure to determine whether the override condition exists, and in the presence of the override condition is arranged to maintain the default destination node as the destination node for the master node response. Hence, in such implementations, the chosen master node has the opportunity to determine whether to act on the update destination request or not, taking into account information available to the chosen master node. This can further improve performance, and ensure that an update destination request is not acted upon at a point in time where it is no longer appropriate to alter the destination.

The override conditions checked for can take a variety of forms, dependent on implementation. In one example implementation, the chosen master node is arranged to determine the presence of the override condition when the master node response has already at least partially been output to the default destination node via the routing network when the update destination request is processed by the chosen master node. It can be useful to perform this check, since it may be the case that at the time the control node decided to issue the update destination request, that control node had not yet received any part of the master node response. However, by the time the chosen master node receives the update destination request and considers it, that position may have changed, and in particular the chosen master node may know that it has at least partially sent the master node response. In such situations, in order to avoid complexity, the chosen master node may merely decide to ignore the update destination request.

By way of specific example, the master node response may be transmitted over the routing network as a sequence of response portions, and the chosen master node may be arranged to determine the presence of the override condition when at least one of the response portions has already been output to the default destination node via the routing network at the time the update destination request is processed by the chosen master node. In such instances, it may be determined appropriate to continue to send all of the remaining response portions to the default destination node.

However, it is not a requirement for the chosen master node to act in this way. For example, in an alternative implementation the chosen master node may be responsive to the update destination request being processed at a time when at least one, but not all, of the response portions have already been output to the default destination node via the routing network, to send a first subset of the response portions to the default destination node, and to send the remaining response portions to the replacement destination node. As a specific example, the first subset may be formed of all of the response portions that have already been output at the time the chosen master node decides to act upon the update destination request.

In one such implementation, the chosen master node is arranged to notify the control node which response portions are within the first subset. This hence enables the control node to determine when it has received all of the response portions that are going to be issued to it. The notification from the chosen master node may also identify that all remaining portions are being sent directly to the slave node associated with the original request.

The trigger event that is detected by the control node, causing it to issue the update destination request, can take a variety of forms, dependent on implementation. In particular, as discussed earlier, the function performed by the control node will vary dependent on the type of control node, and accordingly the type of trigger event that will cause the control node to issue the update destination request will typically be different, dependent on the form of control node being used.

In one example arrangement, the control node is arranged to detect the trigger event when a further slave node request is received from the same slave node that issued the slave node request, both the slave node request and the further slave node request are seeking to access the same data, and the master node response has not yet been received for the control node request issued to service the slave node request. In particular, this may identify a situation where multiple requests can be merged, thereby allowing a reduction in the amount of traffic to be routed over the routing network, and also potentially enabling a reduction in latency.

In one specific example arrangement, the control node is a cache structure, and the slave node request is issued by the slave node in response to a prefetch request from prefetch circuitry of a master device coupled to that slave node, the prefetch request requesting data to be prefetched into the cache structure in anticipation of a demand request being made for that data. The further slave node request is then issued by the slave node in response to a demand request for that data being issued by processing circuitry of the master device. Hence, if as a result of processing the prefetch request the control node has issued a control node request to the chosen master node, and then before that response is received back by the control node the presence of a demand request is detected, where that demand request is requesting the same data as that associated with the prefetch request, in that instance the control node may issue an update destination request to seek to change the destination to be the slave node that issued the original prefetch request.

In some instances, it may be appropriate for the chosen master node to always act upon such an update destination request, particularly if no part of the master node response has yet been issued. However, in some implementations the chosen master node may take into account any required state for the data associated with the further slave request when deciding whether or not to act upon the update destination request. For example, the further slave node request may require the data to be in a specified state, and an indication of that specified state may be provided with the update destination request. In such a scenario, the chosen master node may be arranged to determine the presence of the override condition when the state of the data used to form the master node response is incompatible with that specified state. In the presence of the override condition, the chosen master node may then decide to maintain the default destination node as the destination node for the master node response. It can be useful to perform such a check at the chosen master node. For instance, when servicing the original request, it may be that the data can be returned to the master node in any of a number of different states, some of which may be compatible with the further slave node request and some of which may not. The control node is not in a position to determine whether or not the state will be compatible at the time it determines whether to issue the update destination request, and accordingly that check can be devolved to the master node, once it has actually received the required data, and hence is in a position to determine the state of that data, and in particular whether that data is in a state that is compatible with the specified state for the further slave node request.

In one example implementation, the plurality of nodes comprises a plurality of slave nodes used to couple the interconnect to a first plurality of master devices in a first cluster, each of the master devices in the first plurality having a local cache structure to cache data, and the control node comprises cache coherency circuitry to implement a cache coherency protocol. It should be noted that not all master devices in the first cluster necessarily need to have a local cache structure, but those master devices within the first cluster that do have a local cache structure will be considered to be within the first plurality of master devices. The cache coherency circuitry can then perform snoop operations as required in respect of the master devices in the first plurality, and in particular in respect of the local cache structures of those master devices, in order to ensure that each master device has a coherent view of the data.

However, the system that incorporates such an interconnect may include other master devices that are not directly connected to that interconnect. Indeed, there may be one or more other interconnects within the system, to which other master devices are coupled, and which may also have local cache structures, and in that instance cache coherency cannot be ensured merely by performing snoop operations in respect of the master devices of the first plurality.

By way of example, the chosen master node may be coupled to a further interconnect, and that further interconnect may be coupled to a second plurality of master devices in a second cluster, where each of the master devices in the second plurality has a local cache structure to cache data. In such a scenario, the cache coherency circuitry may be responsive to a request from a first slave node in the plurality of slave nodes to perform a snoop operation during which local snoop requests are issued to at least one master device in the first plurality, and an external snoop request is sent as the control node request to the chosen master node, to cause snoop requests to be performed by the further interconnect in respect of at least one master device in the second plurality. The cache coherency circuitry is then responsive to receiving a snoop response for each local snoop request prior to the master node response being received from the chosen master node, to issue the update destination request to the chosen master node to specify the first slave node as the replacement destination node, to cause the master node response to be returned from the chosen master node to the first slave node, bypassing the cache coherency circuitry.

In such a scenario, it is likely that the local snoop requests will be serviced more quickly than the external snoop request, since the external snoop request will require snoop requests to be propagated on to one or more of the second plurality of master devices to allow snoop operations to be performed therein, with the responses then needing to be returned back to the chosen master node through one or more intervening interconnect structures. Hence, in situations where the cache coherency circuitry determines that all of the local snoop requests have been processed, and it is merely now waiting for the response from the chosen master node to indicate that the external snoop request has been processed, the cache coherency circuitry may issue the update destination request to the chosen master node. This ensures that, when in due course a response is received back at the chosen master node, the chosen master node can propagate that response on without delay to the originating slave node, thereby reducing latency.

In one particular example arrangement, the master node response represents a consolidated snoop response from the master devices in the second plurality that were subjected to snoop requests as a result of the external snoop request sent to the chosen master node.

The above-discussed approach can be used independent of the number of clusters accessed via the chosen master node, with the master node response representing a consolidated snoop response from the master devices accessed in any cluster other than the first cluster.

The type of coherency operations required will depend on the form of the original request from the first slave node. In one example arrangement, the request from the first slave node requires each master device other than the master device coupled to the first slave node to invalidate any local cached copy of the data identified by the request. Hence, in such an implementation, there is no need for the data itself to be returned to the first slave node, and all the first slave node requires is confirmation that all of the required invalidation operations have been performed in respect of local cached copies held by any other master devices. In such instances, it can be particularly efficient to enable the destination node to be updated to be the first slave node once the cache coherency circuitry has received all of the local snoop responses to confirm that any locally cached copies have been invalidated, since thereafter the consolidated snoop response received by the chosen master node will confirm that all required invalidations have been performed, and hence can be used to signal to the first slave node that the required coherency actions have been completed.

Particular examples will now be described with reference to the Figures.

FIG. 1A is a block diagram illustrating a system incorporating an interconnect in accordance with one example implementation. A number of master devices 10, 20 may be connected to associated slave nodes 50, 55 within the interconnect. Similarly, one or more slave devices 40 may be coupled to the interconnect via an associated master node 65. Whilst for simplicity of illustration the example of FIG. 1A merely shows two master devices and one slave device connected to the interconnect, it will be appreciated that the number of master devices and slave devices connected to any particular interconnect will vary dependent on the implementation, and in some implementations there could be significantly more master devices and slave devices connected to the interconnect.

As also shown in FIG. 1A, the interconnect 30 can include one or more control nodes 60. Each control node can be used to receive at least certain types of requests issued by the slave nodes in response to requests received by their connected master devices, and to perform a predetermined operation in order to process such requests. If a request can be directly processed by the control node, then the required response can be returned to the slave node directly from the control node. However, if the request cannot be serviced, at least not fully, directly by the control node, then a control node request can be propagated on from the control node 60 to an appropriate master node 65, to enable a request to be propagated on to a slave device 40 that is used to service the request. When the response is subsequently received from the slave device at the master node 65, then that response can be routed back to the master control node 60. At that point, the response may then be returned from the control node 60 to the originating slave node, 50, 55, i.e. the slave node that issued the original request.

As also shown in FIG. 1A, communication may be possible directly between a slave node 50, 55 and master node 65, to enable one or more communications to bypass the control node 60. As will be discussed in more detail herein, these communication paths are selectively used to enable a response from a master node to be issued directly to a slave node, bypassing the control node 60. In particular, in situations where the control node 60 has been set as a default destination node for the master node response, but prior to the master node response being issued the master node 65 receives an update destination request from the control node 60, specifying one of the slave nodes 50, 55 as a replacement destination node, then the master node 65 can be arranged to issue the master node response to the identified slave node, 50, 55, thus enabling the control node 60 to be bypassed. This can give rise to a reduction in latency within the interconnect, and also can enable more efficient utilisation of the bandwidth available within the routing network of the interconnect that is used to provide the various communication paths illustrated schematically in FIG. 1A.

Figure 1B:
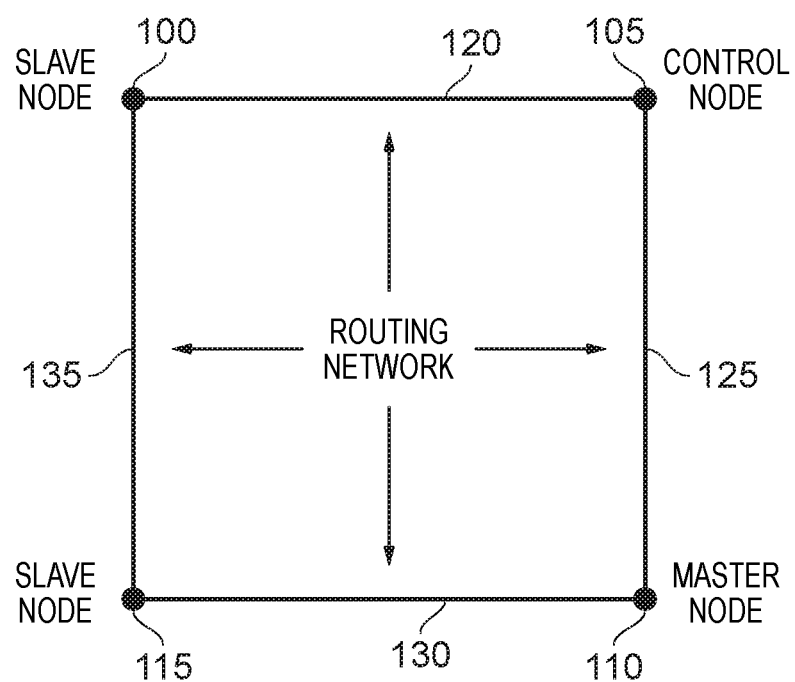
FIG. 1B is a diagram schematically illustrating an interconnect in accordance with one particular arrangement.

The various bidirectional lines shown within the interconnect 30 of FIG. 1A are intended to schematically illustrate the routing network within the interconnect used to connect together the various slave nodes, master nodes and control nodes provided within the interconnect. The manner in which the various communication paths are implemented to provide the routing network will vary dependent on implementation. FIG. 1B illustrates one example implementation where the routing network is provided by a ring structure formed of the paths 120, 125, 130, 135. The various slave nodes, master nodes and control nodes are provided at the intersections between the paths forming the ring, as illustrated in FIG. 1B. In this example, to be consistent with the nodes shown in FIG. 1A, two slave nodes 100, 115, one control node 105 and one master node 110 are shown. However, it will be appreciated that there may be a number of further nodes provided within an interconnect, and in that event the number of connecting paths used to form the ring would increase. The ring may be formed as a unidirectional ring, where all communication pass in the same direction, i.e. clockwise or anticlockwise, or alternatively may be formed as a bidirectional ring where communications can pass in either direction, i.e. clockwise and anticlockwise. The various communication paths 120, 125, 130, 135 shown in FIG. 1B may actually be used to provide multiple channels of communication, and for each channel there may be in some instances a single direction of transmission around the ring. Hence, for example, requests may be propagated clockwise within a request communication channel, while responses may be propagated anticlockwise within one or more response channels.

Hence, it will be appreciated from FIG. 1B, that while the schematic communication paths illustrated in FIG. 1A serve to illustrate sources and destinations of various communications, the actual path over which the communications are routed may physically overlap, and the time taken for any particular communication to reach the destination may vary dependent on the physical layout of the routing network used to provide the interconnect 30. In some instances, the ability to bypass the control node when providing the response from the master node, due to the destination node for the response being updated in response to an update destination request, can yield significant latency improvements. For instance, consider a situation where responses are propagated clockwise around the ring illustrated in FIG. 1B, and a response issued by the master node 110 is initially to be returned to the control node 105, which then in turn may generate a response that is propagated back to the slave node 100, it will be appreciated that the response from the master node to the control node will need to traverse three sides of the ring 130, 135, 120, and then in due course the response from the control node will need to traverse three sides of the ring 125, 130, 135 in order to reach the slave node 100. However, if after having issued a request to the master node 110, and before the master node response is returned, the control node 105 issues an update destination request to the master node 110, causing the destination for the master node response to be updated to be the slave node 100, then the master node response can in due course be routed directly to the slave node 100, which only requires two sides of 130, 135 of the ring to be traversed.

Figure 2:
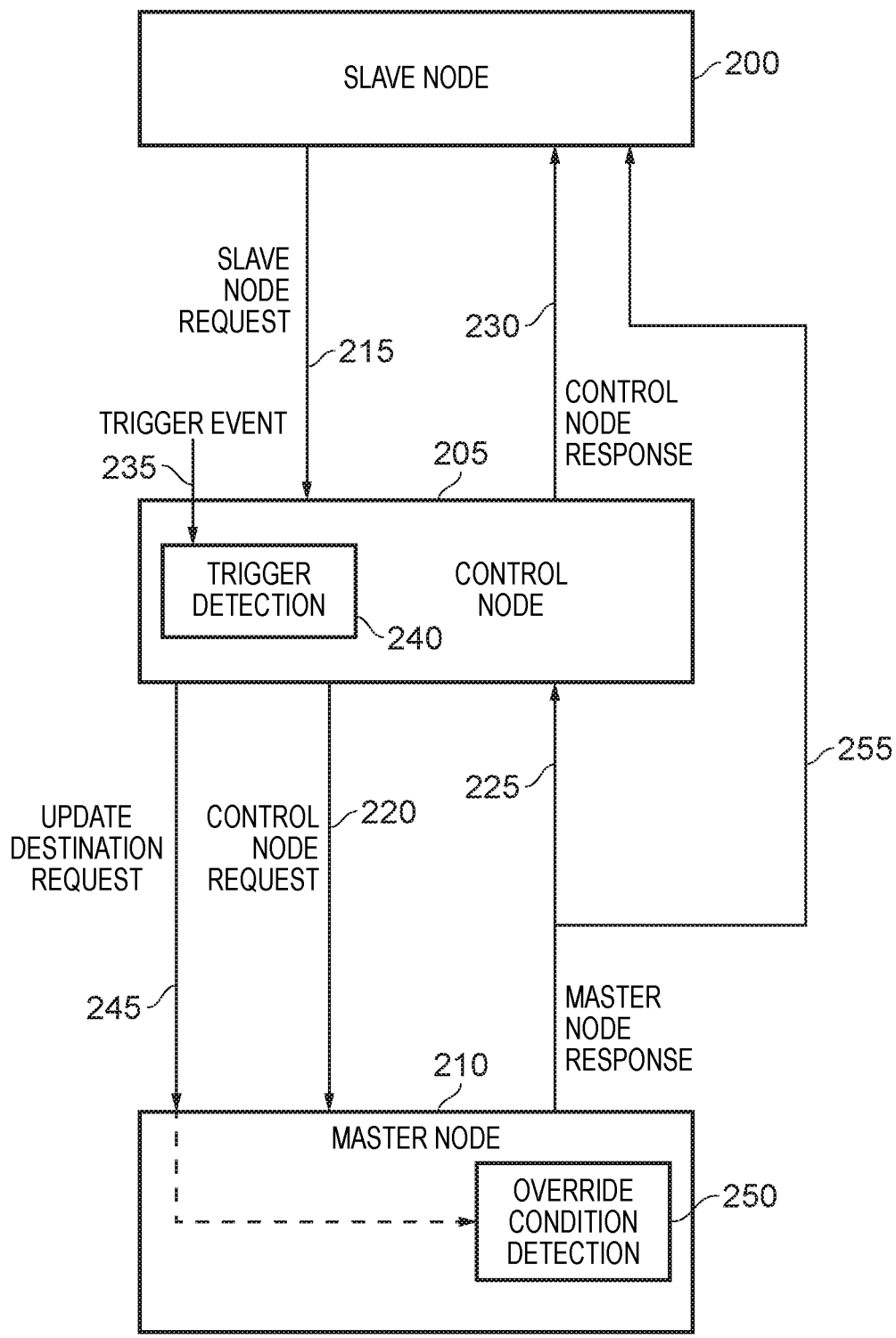
FIG. 2 illustrates communications that may take place between a slave node, control node and master node within an interconnect in accordance with one example arrangement.

FIG. 2 is a diagram schematically illustrating a series of communications that may take place between the slave nodes, control node and master node within the interconnect. In this example, a slave node 200, control node 205 and master node 210 are provided. Responsive to a request issued by a master device connected to the slave node 200, the slave node 200 issues a slave node request 215 through the routing network of the interconnect to the control node 205. The control node then performs an operation to seek to service the slave node request. The operation performed will depend on the type of functionality implemented by the control node. For example, the control node could be a cache structure within the interconnect used to cache data for access by the various master devices connected to slave nodes of the interconnect. In such a scenario, the slave node request may specify an address for an item of data required by the master device connected to the slave node 200, and the operation performed by the control node would in that case involve performing a lookup operation within the cache to determine whether the item of data is already cached therein. If it is, then the data can be returned directly to the slave node 200 as a control node response over path 230. However, if the data is not present within the cache, then a control node request 220 can propagated onto the master node 210, in this example the master node 210 being connected to a slave device forming a lower level of the memory hierarchy, for example a lower level of cache and/or main memory.

The master node will then respond to the control node request by initiating a lookup operation within the lower level of the memory hierarchy, which in due course results in the data being returned to the master node. Thereafter it can be returned as a master node response over path 225 to the control node 205. That returned data can then be propagated back to the slave node 200 as a control node response over path 230.

As another example, the control node may take the form of cache coherency circuitry used to perform snoop operations in order to seek to maintain coherency between various cached copies of data that may be maintained within the system. For example, in FIG. 1A each of the master devices 10, 20 may include local cache structures that can be used to cache data. If one master device (for example the master device 10) issues a request for an item of data (for example because it does not already have a local copy of that data cached), then the cache coherency circuitry operating as the control node 60, 205 may issue a snoop request to the slave node of the other master device (for example the master device 20), in order to cause a snoop operation to be performed within that other master device's local cache in order to determine whether a copy of the data is stored therein. If so, that data can be returned to the control node for forwarding directly back to the slave node 200 without needing to access any lower levels of the memory hierarchy in order to obtain the data.

However, it may be that not all of the master devices that are capable of locally caching data are connected directly to the interconnect 30, and indeed one or more other master devices may be provided in other clusters within the system, that need to be accessed via the master node 210. In that instance, the cache coherency circuitry 205 may issue local snoop requests to the slave nodes of locally connected master devices, and may issue as a control node request 220 an external snoop request that is used by the master node 210 to propagate a snoop request via any intervening interconnect structures, in order to cause snoop operations to be performed in one or more other clusters of master devices within the system. Typically, the master node may then receive a consolidated snoop response from those external master devices, which can then be provided as a master node response over path 225 to the control node 205, i.e. the local cache coherency circuitry within the interconnect 30. Based on that consolidated response, and any response received from the local master devices, the control node 205 can then issue a snoop response as a control node response over path 230 to the slave node 200.

In each of the above discussed examples, the control node 205 is set as the default destination when issuing a control node request 220 to the master node 210. However, as will be discussed in more detail herein, in the presence of one or more trigger events 235, that may be detected by trigger detection circuitry 240 within the control node 205, the control node can be arranged to issue an update destination request over path 245 to the master node 210. Subject to any checks performed by the override condition detection circuitry 250, the master node 210 may then update its tracking record to identify that the destination node for the response to be generated for the control node request is no longer to be the control node 205, but instead is to be the node identified in the update destination request. Typically the destination specified by the update destination request will be the slave node 200 that issued the original slave node request. When the master node response is then subsequently available, it can be routed over path 255 back to the slave node 200, bypassing the control node 205. This can give rise to a reduction in latency within the interconnect, and also can result in more efficient usage of the available bandwidth of the routing infrastructure provided by the routing network of the interconnect 30. If desired, the master node response can also be returned to the control node 205 over the path 225, as well as being routed over the path 255 to the slave node 200.

There may be a variety of different trigger events that can cause the control node to issue the update destination request, and examples will be discussed later with reference to specific example implementations of the control node 205. Further, the override conditions that may be checked for by the override condition detection circuitry 250 within the master node 210 can take a variety of different forms, and again example override conditions will be discussed later for particular implementations. However, in summary, a trigger event detected by the control node will be an event that indicates to the control node that it would now be more appropriate to provide the response directly back to the slave node, rather than to the control node itself. Further, the override condition(s) detected by the master node will be conditions that indicate that it would not be appropriate to act upon the update destination request issued by the control node, and that instead the response should continue to be provided to the default destination, i.e. the control node 205, where any appropriate additional steps can be taken before a control node response is issued back to the slave node 200.

Figure 3:
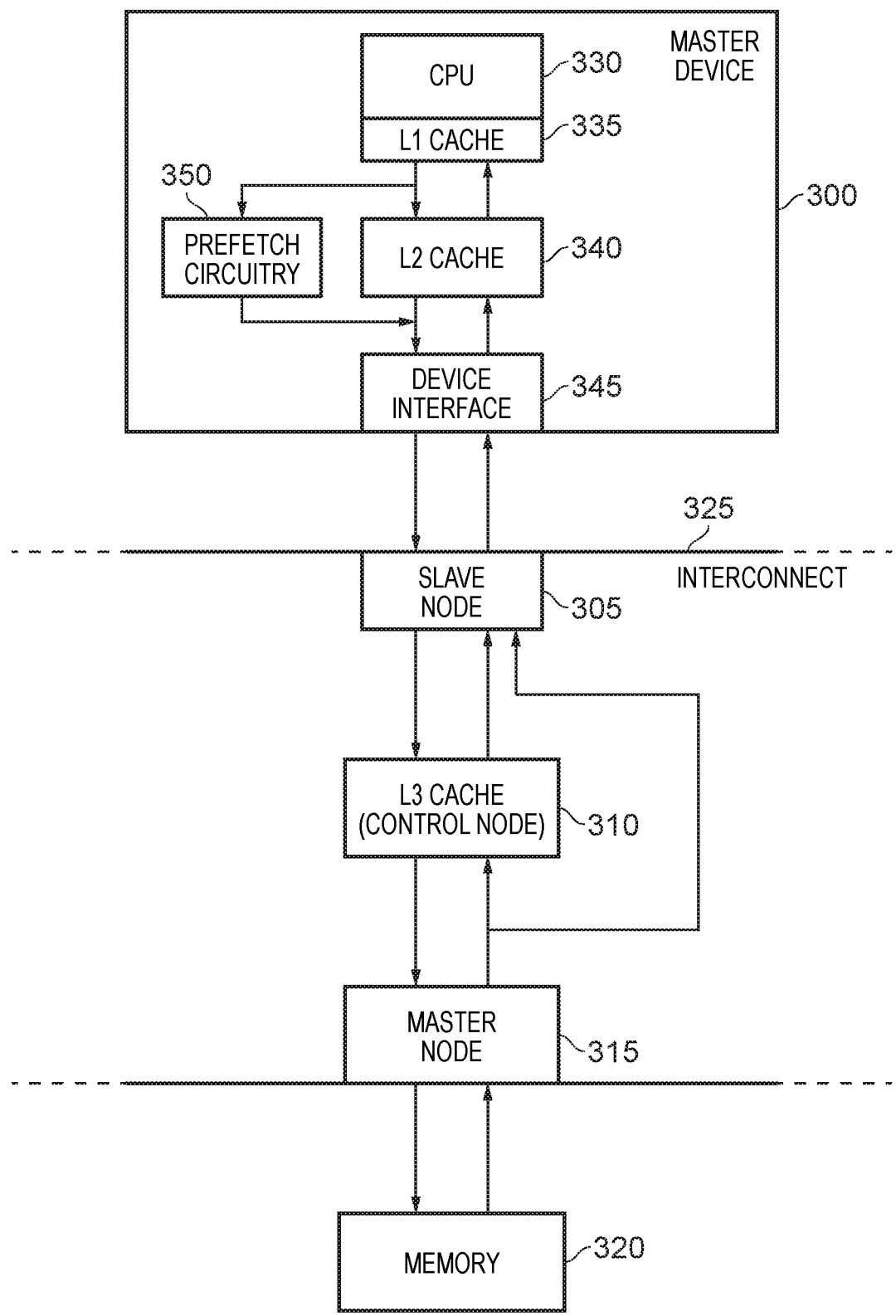
FIG. 3 illustrates one example implementation where the techniques described herein may be employed.

FIG. 3 illustrates one example implementation where a prefetch matching technique is used to identify situations where an update destination request should be issued to the master node 210. In this specific example, the control node 205 takes the form of a level 3 cache 310 provided within the interconnect 325. A master device 300 is connected to a slave node 305 of the interconnect 325 via a device interface 345 of the master device. As shown in FIG. 3, the master device includes a central processing unit 330 with an associated level 1 cache 335, but also includes a level 2 cache 340.

When the CPU 330 issues a request specifying an address of a data item to be accessed, then a lookup may be performed within the level 1 cache 335, and if a hit is detected then the access can be performed directly using the contents of the level 1 cache. However, in the event of a miss in the level 1 cache, then a request is propagated to the level 2 cache 340 and in this example that request is also received by the prefetch circuitry 350. The request received by the level 2 cache causes the level 2 cache to perform a lookup within the level 2 cache, and in the event that a hit is detected, then the access can be serviced using the contents of the level 2 cache. However, if a miss also occurs in the level 2 cache then a request will be propagated on via the device interface 345 to the slave node 305, which in turn will cause a request to be issued to the level 3 cache 310. If the data being requested is present within the level 3 cache then the access can be performed using the contents of the level 3 cache, whereas otherwise the request is propagated on via the master node 315 to the memory 320. As discussed earlier, the memory 320 may be one or more lower levels of the cache hierarchy and/or main memory.

The prefetch circuitry 350 is used to seek to detect patterns in the accesses issued by the level 1 cache 335 in order to seek to predict the data that is likely to be required by the CPU 330 in the near future. It can then use that information to issue prefetch requests to cause the data items that it predicts will be needed shortly to be prefetched into a level of cache. In this particular example, the prefetch circuitry issues requests via the device interface 345 to the slave node 305, to cause prefetch requests to be issued to the level 3 cache 310 in order to cause such data items to be prefetched into the level 3 cache. This increases the likelihood that when a request is issued from the level 2 cache 340, the data being requested will already reside within the level 3 cache 310, hence increasing performance. If desired, the prefetch circuitry 350 can monitor the access requests issued from the level 2 cache 340 rather than the access requests issued from the level 1 cache 335, when seeking to identify access patterns, and dependent on those access patterns then issue prefetch requests.

Figure 4A:
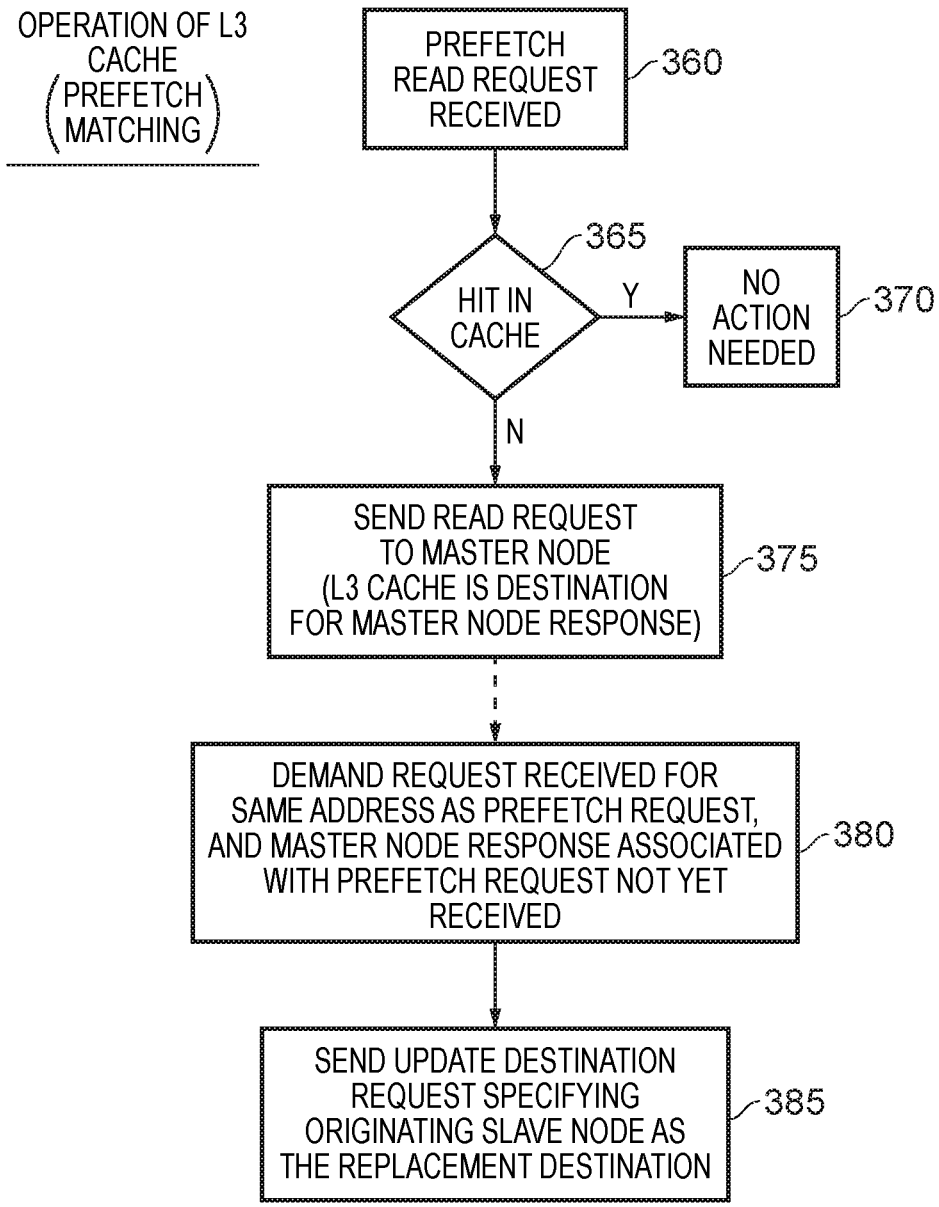
FIG. 4A is a flow diagram illustrating the operation of the Level 3 cache of FIG. 3 when employing a prefetch matching technique in accordance with one example arrangement.
Figure 4B:
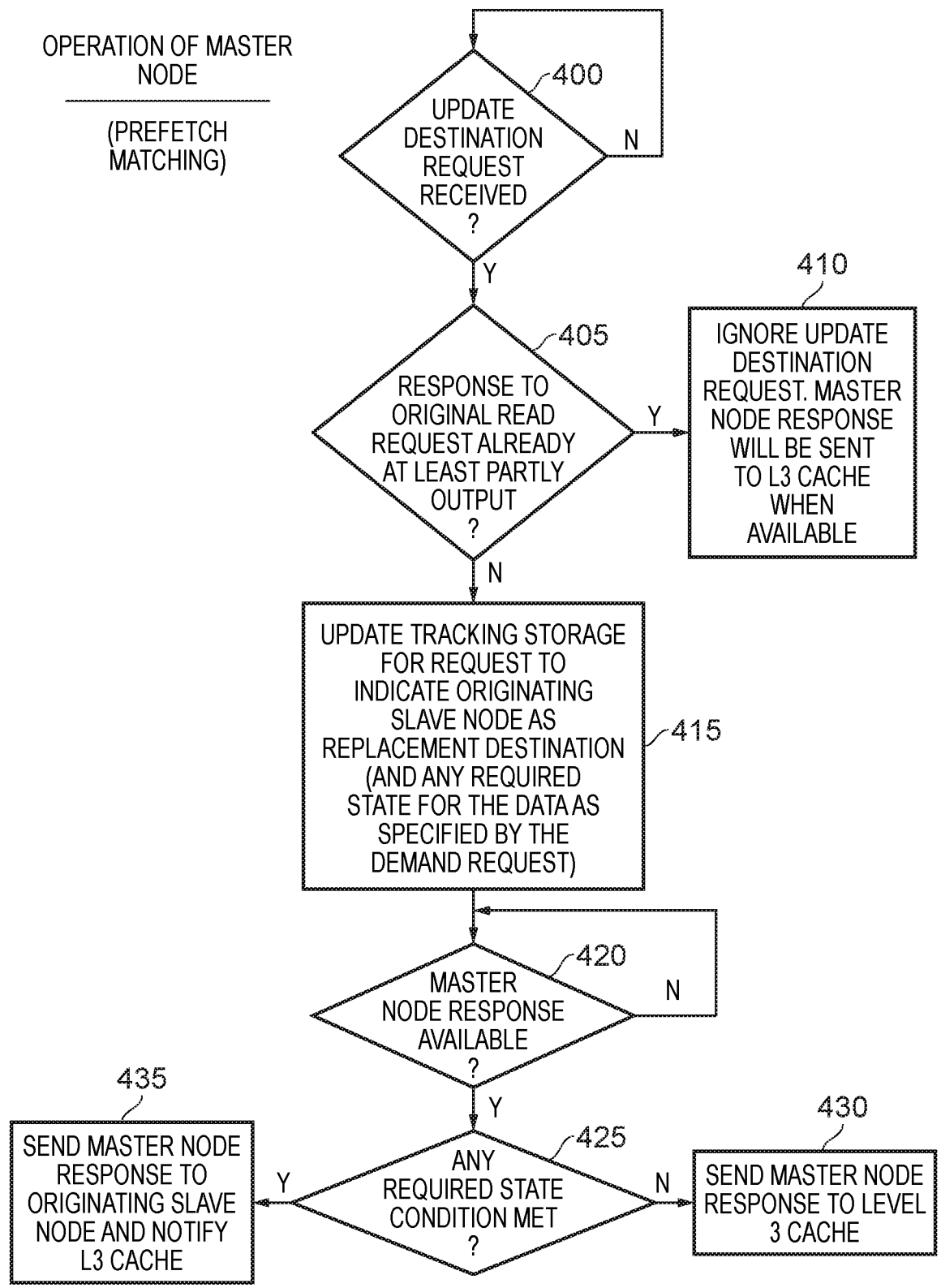
FIG. 4B is a flow diagram illustrating the operation of the master node of FIG. 3 in order to process an update destination request in accordance with one example arrangement.

FIGS. 4A and 4B are flow diagrams illustrating the operation of the level 3 cache 310 and the master node 315, respectively, when implementing a prefetch matching mechanism to identify situations where it is appropriate to issue an update destination request from the level 3 cache 310 to the master node 315. As shown in FIG. 4A, at step 360 a prefetch read request is received by the level 3 cache 310 from the slave node 305. As discussed earlier, such a prefetch request will have been received due to the activities of the prefetch circuitry 350 within the master device 300. At step 365, a lookup operation is performed within the level 3 cache 310 in order to identify whether the data associated with the address specified in the prefetch read request is already stored within the level 3 cache. If so, then, as indicated by step 370, no further action is needed, since the data already resides within the level 3 cache, and accordingly will be available if a subsequent demand access is received from the master device seeking access to that data.

However, if a hit is not detected in the level 3 cache, then at step 375 a control node request is issued from the level 3 cache 310 to the master node 315, in this instance the control node request being a read request which identifies the level 3 cache as the destination for the master node response. In this instance, the master node response will be a cache line's worth of data that includes the data item being requested.

As indicated by the dotted line in FIG. 4A, at some subsequent point in time, prior to the level 3 cache receiving the master node response for the read request sent at step 375, a demand request is received at step 380 specifying the same address as the prefetch request. Hence, at this point, it is known that the CPU 330 has indeed issued a request for the data predicted by the prefetch circuitry 350, and a miss has occurred within the level 1 and level 2 caches 335, 340, resulting in the demand request being issued via the slave node 305 to the level 3 cache 310. Given the matching addresses, at this point the level 3 cache detects a prefetch match, i.e. has identified that the demand request is seeking to access the data that is already the subject of the pending read request to the master node due to the earlier prefetch request. Accordingly, at step 385, the level 3 cache 310 issues an update destination request specifying the originating slave node as the replacement destination.

FIG. 4B is a flow diagram illustrating the operation of the master node 315 upon receipt of such an update destination request. In particular, if at step 400 such an update destination request is received by the master node 315, then the process proceeds to step 405 where the master node determines whether the response to the original read request has already at least partly been output by the master node back to the level 3 cache 310. In particular, it may be the case that, due to the available bandwidth in the communication path between the master node 315 and the level 3 cache 310, the entire cache line's worth of data may not be returned in a single cycle, and instead multiple beats (transfers) may be required in order to return the required cache line's worth of data to the level 3 cache.

In the example shown in FIG. 4B, if at least one beat has already been issued, then it is determined at step 405 that the response has already at least partly been output, and in that event the override condition is determined to be present, and the process proceeds to step 410 where the update destination request is ignored. Hence, the entire master node response will be sent to the level 3 cache when that data is available.

If at step 405, it is determined that no part of the response has already been output, then the process proceeds to step 415 where a tracking storage record within the master node is updated for the request in question, to indicate the originating slave node as the replacement destination. As will be discussed in more detail later, if the demand access request specified any particular state that the data needed to be in, then that state information can also be captured within the updated tracking storage record.

The process then proceeds to step 420 where it is determined whether the master node response is yet available. Once the master node response is available, then the process proceeds to step 425 where it is determined whether any required state condition has been met. Accordingly, at this point, any restrictions on the state as specified in the required state information maintained in the updated tracking storage record can be referred to in order to determine whether the state of the data returned from the memory is compatible with the state required by the demand access. If not, then an override condition is again detected, and the master node will send the master node response to the level 3 cache at step 430, hence ignoring the update destination request at this point. However, assuming any required state condition is met, then the process proceeds to step 435 where the master node response is sent to the originating slave node as identified in the updated tracking storage record. In addition, a notification will typically be sent to the level 3 cache 310 to identify that the response is being forwarded directly to the slave node 305, so as to enable to level 3 cache to determine that its request has now been serviced.

It will hence be appreciated that by adopting such a prefetch matching approach, this can significantly improve efficiency within the interconnect. In particular, the latency can be reduced for servicing the demand access request, since the response is provided directly to the slave node, rather than being routed via the level 3 cache. Further, the overall efficiency in the use of the available bandwidth of the routing network within the interconnect is improved, since the prefetch request and subsequent matching demand request are effectively merged into a single request.

Figure 5:
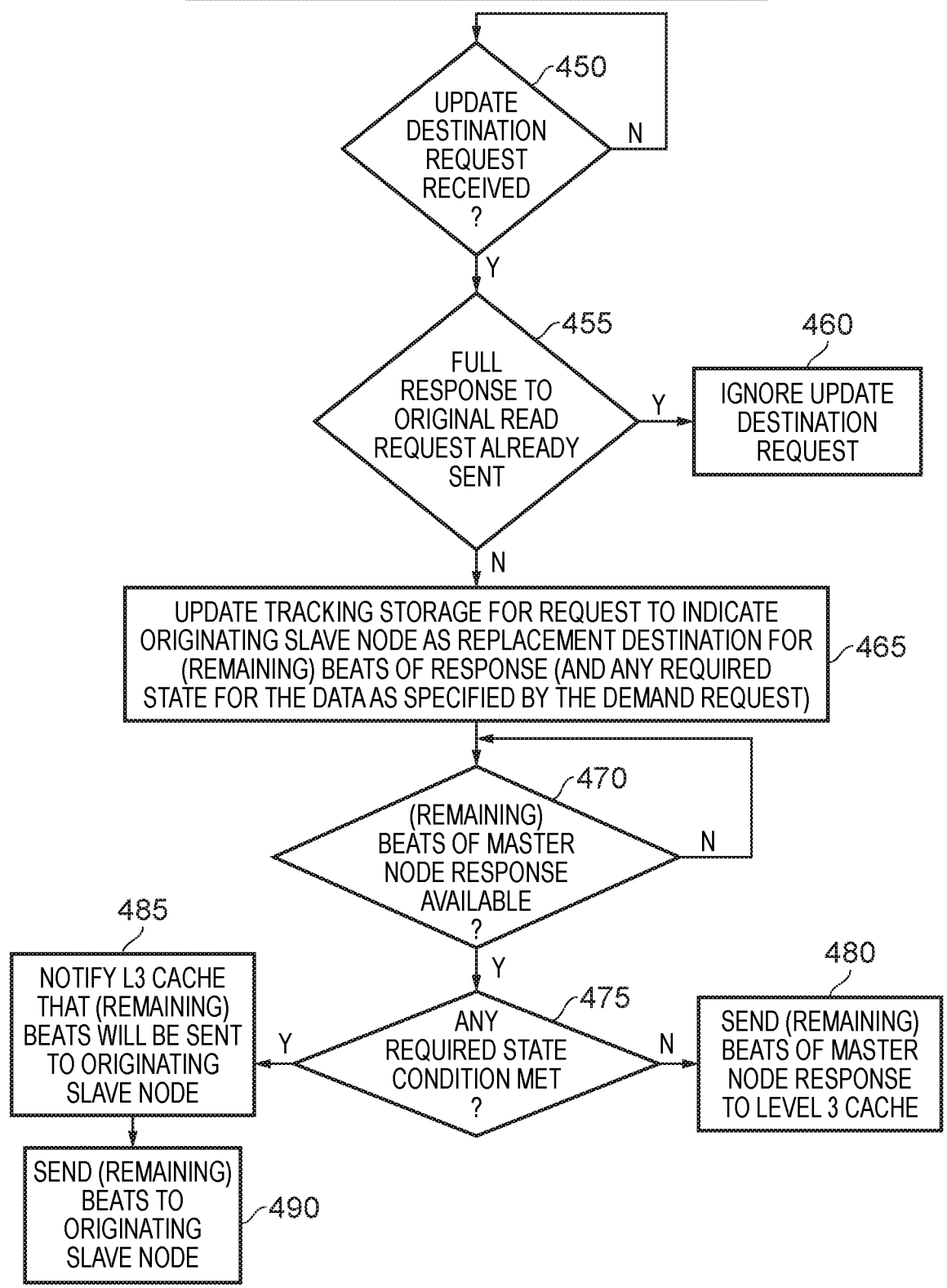
FIG. 5 is a flow diagram illustrating a process that may be performed instead of the process of FIG. 4B, in accordance with an alternative implementation.

In the example of FIG. 4B, the update destination request is ignored if any part of the master node response has already been issued by the time the update destination request is reviewed by the master node. However, in alternative implementation, as illustrated in FIG. 5, the update destination request can still be serviced even if the master node response has started to be output. In particular, if at step 450 an update destination request is received, then at step 455 it is determined whether the full response to the original read request has already been sent, and if so the process proceeds to step 460 where the update destination request is ignored. It is possible for this situation to arise due to the difference in time between the point at which the level 3 cache 310 issues the update destination request, and the point in time when the update destination request is reviewed by the master node 315.

However, if at step 455 it is determined that the full response has not yet been sent, then the process proceeds to step 465 where the tracking storage for the request in question is updated to indicate the originating slave node as the replacement destination for all remaining beats of the response. As with step 415, any required state information for the data as specified by the demand request can also be captured within the updated tracking storage record. Hence, if any beats have already been sent back to the level 3 cache, but there are still some remaining beats that have not, then the remaining beats will be delivered directly back to the slave nodes 305.

In particular, at step 470 it is determined whether the remaining beats of the master node response are available, and if so it is then checked whether any required state condition is met at step 475. If not, then the remaining beats are sent to the level 3 cache at step 480, and hence at this point the update destination request is effectively ignored. However, assuming any required state conditions are met, then the process proceeds to step 485, where the master node 315 notifies the level 3 cache 310 that the remaining beats will be sent to the originating slave node. Thereafter, at step 490, the remaining beats are sent to the originating slave node. By notifying the level 3 cache that the remaining beats will be sent to the originating slave node, this enables the level 3 cache to identify that it will not be receiving any further beats of the response, and to take any remaining action that may be required. For example, if it has received some of the earlier beats of the response, it will need to forward those beats of the response to the slave node, so that, in combination with the beats received directly from the master node, the slave node 305 will have all of the beats required to form the full response. Further, it should be noted that if there are any ordering constraints between the beats, for instance if the slave node needs to receive all of the beats in order, then a handshake protocol can be implemented between the master node 315 and the level 3 cache 310 between performance of steps 485 and 490, to ensure that the level 3 cache returns any beats that it has received to the slave node 305, prior to the process proceeding to step 490 where the master node directly returns the remaining beats to the slave node 305.

Accordingly, it can be seen that the present technique provides a very flexible approach. In particular, in situations where the complexity of sending part of the response to the control node and the remaining part of the response directly to the slave node can be tolerated, then the approach of FIG. 5 can be used. However, otherwise, the approach of FIG. 4B can be employed, so that an override condition will be detected if any part of the response has already been output to the control node by the time the update destination request is processed by the master node.

Figure 6:
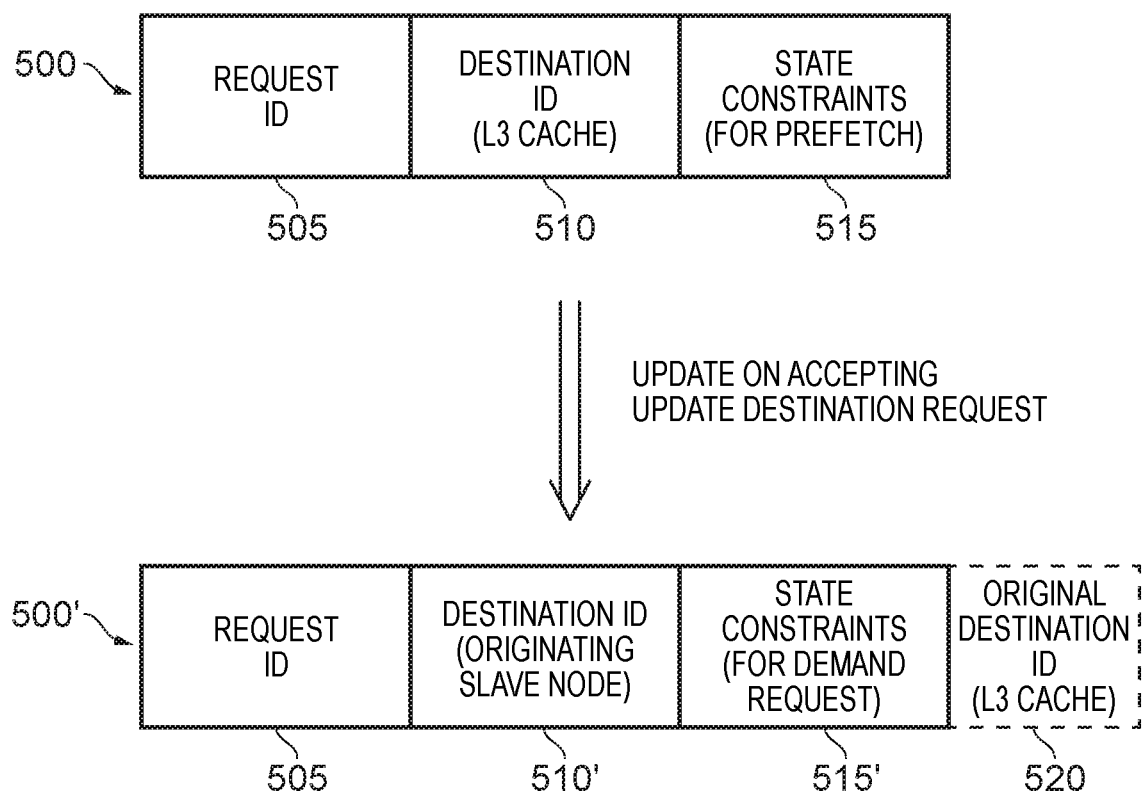
FIG. 6 schematically illustrates how tracking storage within the master node of FIG. 3 may be updated when accepting an update destination request, in accordance with one example arrangement.

FIG. 6 schematically illustrates the contents of a tracking storage record that may be kept within the master node 65 to track a pending request. In particular, this information is used by the master node to determine how to route the response when it is received from the slave device. When the original request is processed, an entry 500 is populated within the tracking storage, this entry including a number of fields. In particular, an ID field 505 is used to store a request identifier to distinguish the request from any other pending requests. A field 510 is then used to specify a destination ID for the response, this hence identifying the node within the interconnect to which the response should be routed from the master node when it is available. Hence, with reference to the earlier example of FIG. 3, when the prefetch request is received from the level 3 cache 310, the level 3 cache will be identified in the field 510 as the destination for the response. A further field 515 is used to specify any state constraints. Hence, this may for example identify any state constraints associated with the data to be returned as the master node response for the prefetch request.

For example, the prefetch request issued from the master device and propagated via the slave node 305 to the level 3 cache may be a "ReadNotSharedDirty" request, which means that the data to be prefetched into the level 3 cache can be in any legitimate state other than the shared dirty state. In particular, the shared dirty state would indicate that the data is shared with the cache of at least one other master device and is more up to date than the version held in main memory. Hence, in one example implementation, legitimate states for the prefetch response would be unique clean, unique dirty or shared clean, but not shared dirty. This state constraint information can be captured within the field 515.

As indicated in FIG. 6, when the update destination request is accepted, the entry is updated to the form 500'. In particular, the request identifier in field 505 remains unchanged, but the destination identifier within the field 510' is updated so as to identify the originating slave node, i.e. the slave node that issued both the prefetch request and the subsequent demand request. The field 515' is then updated to identify the state constraints that are applicable for the demand request. By way of example, the demand request may be a "ReadClean" request meaning that the allowed states are unique clean or shared clean. It will be appreciated that these are a subset of the allowed states for the earlier mentioned ReadNotSharedDirty prefetch request.

As indicated by the dotted box 520, the entry may also be supplemented to capture information about the original destination, i.e. the level 3 cache, and if desired to also store the state constraints associated with that original request that was to be routed to the original destination. However, in some instances there may be no specific requirement for this extra field. For example, this may not be needed if there is only one possible level 3 cache destination ID in the system, and hence that can be inferred if in due course it is determined that it is appropriate to return the response to the original destination rather than to the originating slave node. As another example, if the request sent by the master node to the slave device in response to the prefetch request was such that all allowed states that could returned by the slave device are within the allowed states for the demand request, then it will be known that there will not be a need to revert back to the level 3 cache as the destination, and accordingly that information does not need to be captured.

Considering the specific example mentioned above where the prefetch request was a ReadNotSharedDirty request and the subsequent demand request was a ReadClean request, then it will be appreciated that when applying step 425 of FIG. 4B, or the corresponding step 475 of FIG. 5, it will be determined that any required state condition is met if the data returned from the memory system is in the unique clean or shared clean states, and if that is the case the process can proceed to step 435 of FIG. 4B, or the corresponding step 485 of FIG. 5. However, if the data is returned in the unique dirty state, which is a legitimate state for the prefetch request response but not a legitimate state for the subsequent demand request, then it will be determined that the required state condition is not met and the process will proceed to step 430 of FIG. 4B or the corresponding step 480 of FIG. 5, where the response will be returned to the control node at this point. A cache coherency operation may then need to be invoked in order to deal with the demand request.

As mentioned earlier, the control node 60 shown in FIG. 1 can take a variety of forms. Whilst it may be a cache structure such as the level 3 cache 310 shown in the example of FIG. 3, it could as another example be cache coherency circuitry. In one implementation there may be a control node forming a level 3 cache structure and a control node forming a cache coherency circuit. Indeed, in one particular implementation the cache coherency and cache structures may be integrated into a single control node if desired.

In implementations where a control node forms cache coherency circuitry, then as part of the performance of the cache coherency operations, the cache coherency circuitry can in certain instances decide to issue the update destination request to the master node 65. This will be illustrated by way of example with reference to FIG. 7.

Figure 7:
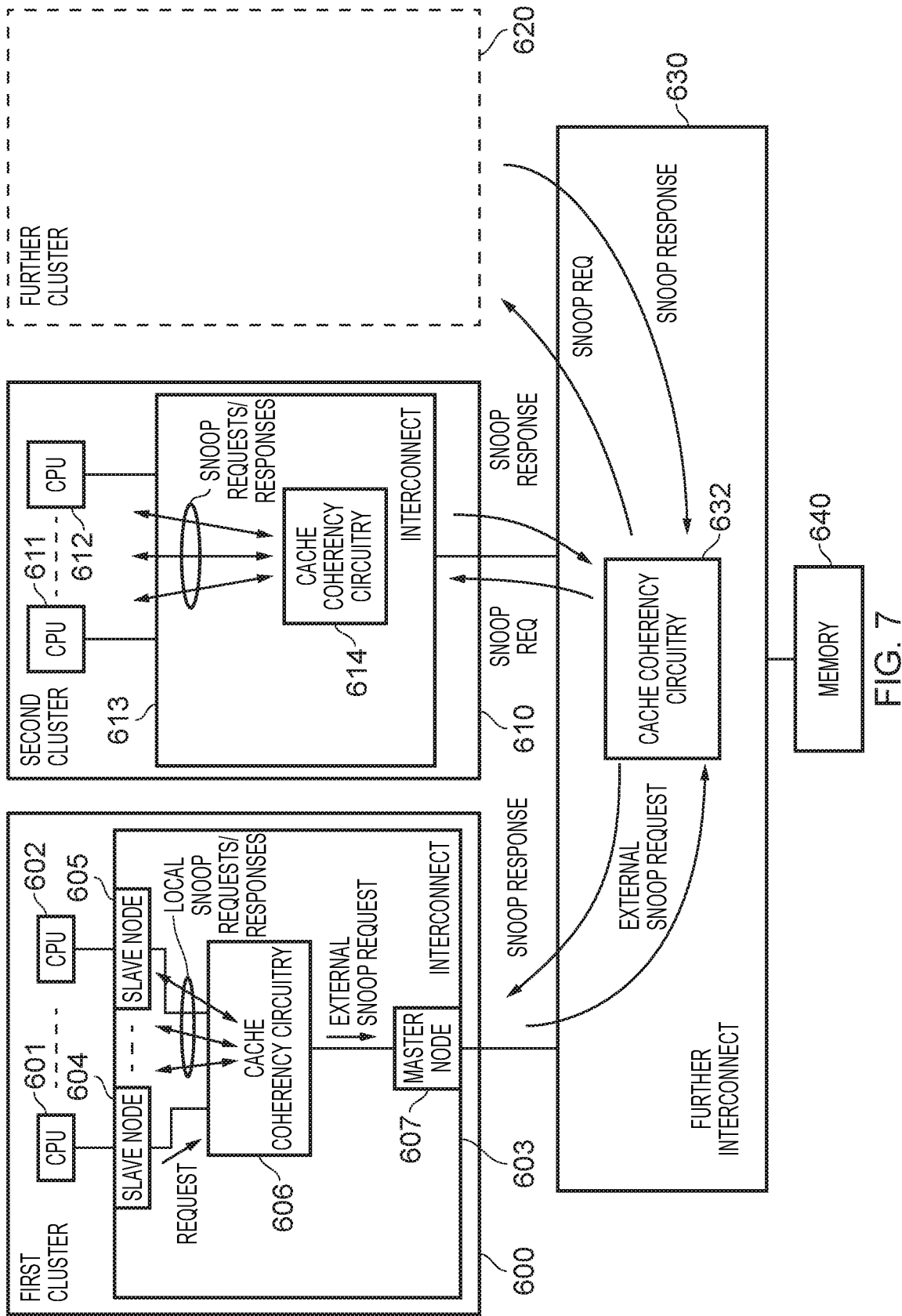
FIG. 7 schematically illustrates a system in accordance with one example implementation.

In the example of FIG. 7, a first cluster 600 is formed with a plurality of processing units 601, 602 coupled to an interconnect 603. The interconnect is constructed as per the earlier described examples, and hence includes a slave node 604, 605 associated with each processing unit 601, 602, and a master node 607 for connecting to a slave device. In this instance, the slave device is formed by the entirety of the system external to the master node 607. In the example illustrated in FIG. 7 the control node 60 is formed by cache coherency circuitry 606.

As shown in FIG. 7, the system not only includes the first cluster 600 but also includes at least the second cluster 610, and optionally one or more further clusters 620. The second cluster includes a plurality of processing units 611, 612 coupled to an associated interconnect 613 that also includes its own cache coherency circuitry 614. Whilst omitted for clarity, the interconnect 613 will be constructed similarly to the interconnect 603, and accordingly will include slave nodes associated with each master device, and a master node for connecting the interconnect 613 to the remainder of the system. The further cluster 620, if provided, will be constructed in the same way as the second cluster 610.

It is assumed that each of the processing units 601, 602, 611, 612 shown have local cache structures that can be used for caching data. Further, as shown in FIG. 7, each of the clusters 600, 610, 620 is connected to a further interconnect 630 that is used to couple those clusters to the memory system 640. The further interconnect also includes cache coherency circuitry 632.

For the purposes of illustration, it will be assumed that the processing unit 601 within the first cluster 600 issues a request for data which causes the slave node 604 to propagate on a request to the cache coherency circuitry 606 requiring a coherency process to be invoked. By way of specific example, the CPU may already have in its local cache structure a copy of a cache line's worth of data that is currently in a shared state, and may issue a "MakeUnique" request when it is seeking to obtain the right to perform a write operation to the cache line.

In one embodiment, the cache coherency circuitry 606 will respond to such requests by issuing one or more snoop requests to cause snoop operations to be performed in order to invalidate any other copies of the data that have been locally cached by any of the other processing units 602, 611, 612. In particular, it may broadcast a snoop request to all the local master devices that may locally cache data, other then the processing unit 601 that is responsible for the request, and may also issue an external snoop request to the master node 607 to cause an external snoop request to be propagated through the system to each of the other processing units, as shown in FIG. 7. In particular, the external snoop request may be propagated on from the master node 607 to the cache coherency circuitry 632, which in turn can issue snoop requests to each of the further clusters to be received by their cache coherency circuits (for example the cache coherency circuit 614 for the second cluster 610), which in turn will then issue snoop requests to the local processing units within the relevant cluster. In response to each snoop request, the processing units will invalidate any locally cached copy of the data, and issue a snoop response to confirm that the invalidation has been performed. Those snoop responses can be consolidated within the various cache coherency circuits, and then routed back via the cache coherency circuitry 632 to form a consolidated snoop response sent to the master node 607. Typically, the cache coherency circuitry 606 will await each of the local snoop responses, and the external snoop response received via the master node 607, at which point it will be determined that all of the invalidations have been performed, and accordingly a response will be sent to the slave node 604 to enable the processing unit 601 to be informed that it now has unique ownership of the cache line in question, and hence can proceed to perform the write operation.

Whilst in the above explanation, it is assumed that each cache coherency circuit broadcasts snoop requests so that every processing unit is snooped, in alternative embodiments one or more of the cache coherency circuits 606, 614, 632 can maintain snoop filter storage to maintain information about processing units that may potentially hold copies of the data, and issue snoop requests on that basis. For example, it may be that a snoop request does not need to be sent to every local CPU within the first cluster (other than the first CPU 601) if the snoop filter within the cache coherency circuit 606 identifies that one or more of those CPUs does not hold a copy of the data. The cache coherency circuitry 632 may also maintain a snoop filter entry, which may enable a snoop request to be omitted from being sent to at least one cluster if the snoop filter identifies that none of the processing units within that cluster contain a copy of the data.

As will be apparent from FIG. 7, when an external snoop request is sent to the master node 607, causing propagation of snoop requests throughout the system, there can be a significant delay before a consolidated snoop response can be returned to the master node 607 from the cache coherency circuitry 632, due to the multiple levels of snooping required within the system in order to ensure that all locally cached copies are invalidated. In contrast, the cache coherency circuitry 606 may relatively quickly receive the snoop responses in reply to the local snoop requests issued to the slave nodes within the interconnect 603. In one example implementation, if all of the local snoop responses have been received, and the cache coherency circuitry 606 is still awaiting the snoop response from the master node 607, it can issue an update destination request to the master node to request that when the consolidated snoop response is subsequently received by the master node, it is routed directly to the slave node 604, i.e. the slave node that issued the original request. This process is discussed in more detail below with reference to the flow diagrams of FIGS. 8 and 9.

Figure 8:
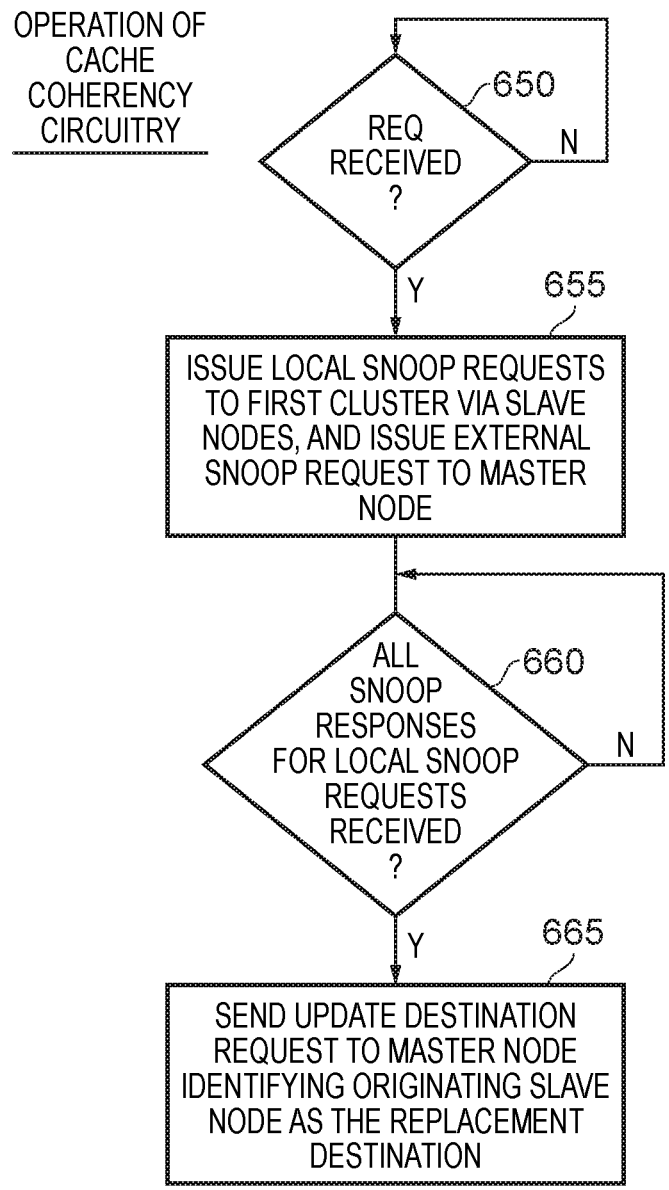
FIG. 8 is a flow diagram illustrating the operation of the cache coherency circuitry provided within the interconnect of the first cluster shown in FIG. 7, in accordance with one example implementation.

FIG. 8 is a flow diagram illustrating the operation of the cache coherency circuitry 606. When a request is received at step 650, for example the request from the slave node 604, then at step 655 the cache coherency circuitry 606 issues local snoop requests to one or more of the processing units in the first cluster via the associated slave nodes. Exactly which slave nodes receive snoop requests may depend on the contents of any snoop filter maintained by the cache coherency circuitry, or as mentioned earlier snoop requests may be broadcast to all of the slave nodes other than slave node 604. In addition, as shown at step 655, an external snoop request is issued to the master node 607.

At step 660 the cache coherency circuitry waits to receive all snoop responses for the local snoop requests that have been issued to the slave nodes within the interconnect 603. If all of those snoop responses are received, and assuming a response has not yet been received from the master node 607, then the process proceeds to step 665 where an update destination request is sent to the master node 607 identifying the original slave node (e.g. slave node 604 in the above-mentioned example) as the replacement destination for the master node response. In particular, since all of the local snoop responses have been received, the cache coherency circuitry knows that all locally cached copies have been invalidated, and when in due course the master node confirms that all of the other copies in the system have been invalidated, that master node response can be used directly to inform the CPU 601, via the slave node 604, that it now has unique ownership of the cache line, and hence can proceed to perform the write operation. Hence, by updating the destination so that that response from the master node is routed directly to the slave node 604, rather than via the cache coherency circuitry 606, this can reduce the latency associated with performing the cache coherency operation.

Figure 9:
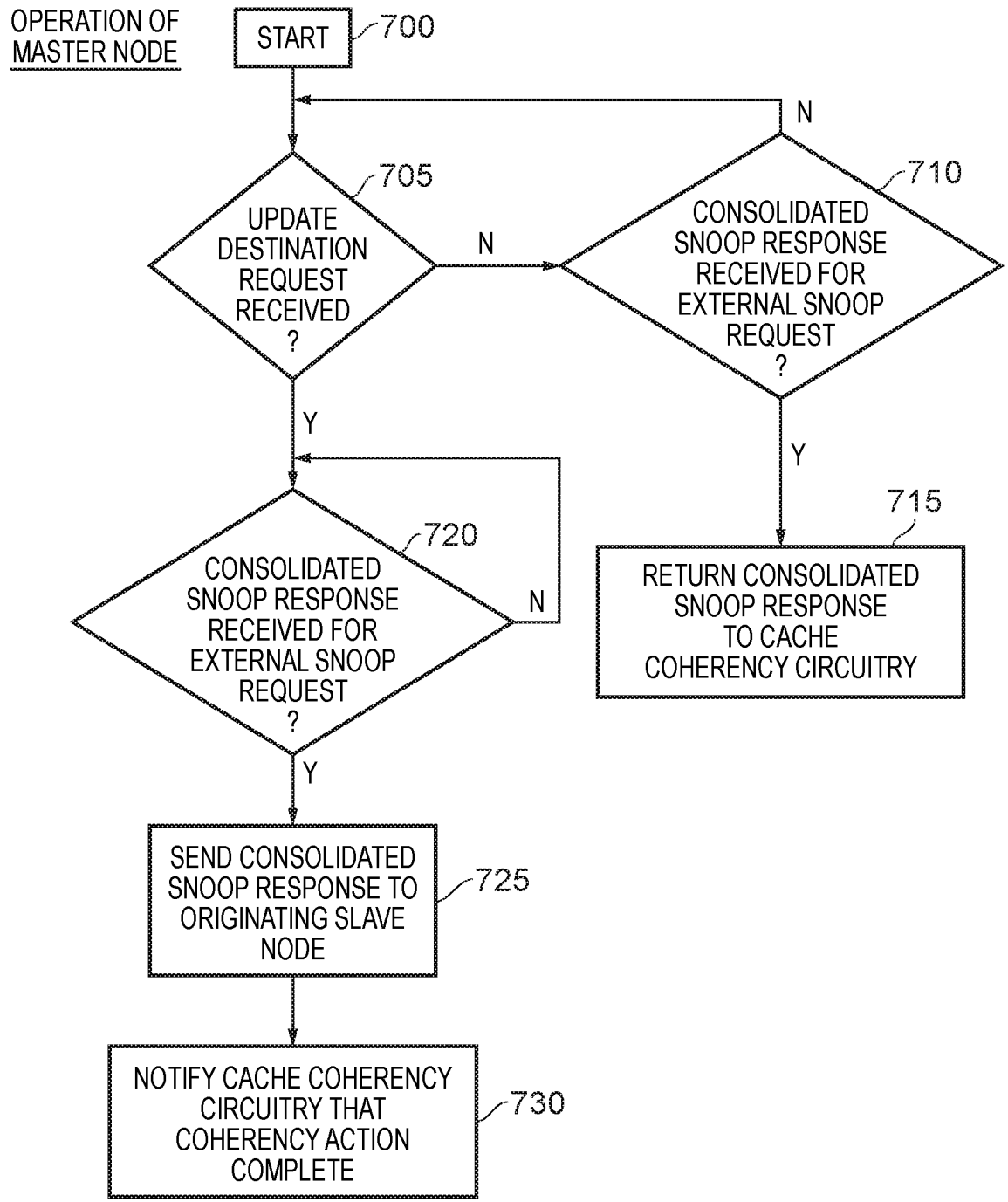
FIG. 9 is a flow diagram illustrating the operation of the master node provided within the interconnect of the first cluster shown in FIG. 7, in accordance with one example implementation.

FIG. 9 is a flow diagram illustrating the operation of the master node 607.

The process starts at step 700, and then at step 705 it is determined whether an update destination request has been received. If not, it is determined at step 710 whether a consolidated snoop response has been received from the cache coherency circuitry 632 within the further interconnect 630, i.e. a consolidated snoop response for the external snoop request that was sent to the master node 607 and propagated onto the further interconnect 630. If such a consolidated snoop response has been received, then the process proceeds to step 715 where the consolidated snoop response is returned to the cache coherency circuitry 606. At this point the cache coherency circuitry 606 knows that all external copies (i.e. any copies cached in cache structures external to the first cluster 600) have been invalidated.

If a consolidated snoop response is not determined to have been received at step 710, then the process returns to step 705. If at step 705 it is determined that an update destination request has been received, then the process proceeds to step 720. At step 720, the master node 607 updates its tracking record entry for the request to identify that the new destination for the response is that specified by the update destination request, i.e the slave node 604 for the example discussed earlier, and then awaits receipt of the consolidated snoop response. When the consolidated snoop response is received at step 720, then at step 725 that consolidated snoop response is sent to the originating slave node (i.e. slave node 604 for the example discussed earlier). At this point, this indicates to the slave node 604 that all relevant cached copies have been invalidated, since the consolidated snoop response received by the master node indicates that this is the case for any cached copies external to the first cluster 600 and, as is apparent from the earlier-discussed FIG. 8, the update destination request would only have been issued if all of the locally cached copies within the first cluster had also been invalidated.

At step 730, the master node 607 notifies the cache coherency circuitry 606 that the coherency action is complete, so that the cache coherency circuitry 606 can update its records. In particular, at that point the cache coherency circuitry 606 no longer needs to track snoop responses for the original request.

By adopting the approach discussed with reference to FIGS. 7 to 9, it will be appreciated that this enables the activity inside the cluster to be parallelised with the activity in the other clusters, and also enables the response to be sent to the requesting core faster without the control node having to coalesce both the internal and external snoop responses.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An interconnect comprising:
   a plurality of nodes;
   a routing network via which information is routed between the plurality of nodes;
   the plurality of nodes comprising at least one slave node used to couple master devices to the interconnect, at least one master node used to couple slave devices to the interconnect, and at least one control node;
   wherein each control node is responsive to a slave node request received via the routing network from a slave node, to perform an operation to service the slave node request and, when a propagation condition is present, to issue a control node request via the routing network to a chosen master node in order to service the slave node request;
   the chosen master node being arranged to process the control node request in order to generate a master node response, and to treat as a default destination node for the master node response the control node that issued the control node request;
   the control node being responsive to a trigger event occurring after the control node request has been issued, to send an update destination request to the chosen master node, the update destination request identifying a replacement destination node for the master node response; and the chosen master node being responsive to the update destination request, at least in the absence of an override condition, to send the master node response via the routing network to the replacement destination node.

2. An interconnect as claimed in claim 1, wherein the replacement destination node is the slave node that issued the slave node request.

3. An interconnect as claimed in claim 2, wherein:
in the absence of the update destination request, the chosen master node is arranged to send the master node response via the routing network to the control node that issued the control node request, and the control node is then responsive to receipt of the master node response to issue a control node response via the routing network to the slave node that issued the slave node request; and
in the presence of the update destination request, at least in the absence of the override condition, the chosen master node is arranged to send the master node response via the routing network to the slave node that issued the slave node request, bypassing the control node.

4. An interconnect as claimed in claim 1, wherein the chosen master node is arranged, when sending the master node response to the replacement destination node, to inhibit also sending the master node response to the control node.

5. An interconnect as claimed in claim 4, wherein the chosen master node is arranged to notify the control node that the master node response has been sent to the replacement destination node.

6. An interconnect as claimed in claim 1, wherein the chosen master node is responsive to the update destination request to perform an override condition check procedure to determine whether the override condition exists, and in the presence of the override condition is arranged to maintain the default destination node as the destination node for the master node response.

7. An interconnect as claimed in claim 6, wherein the chosen master node is arranged to determine the presence of the override condition when the master node response has already at least partially been output to the default destination node via the routing network when the update destination request is processed by the chosen master node.

8. An interconnect as claimed in claim 7, wherein the master node response is transmitted over the routing network as a sequence of response portions, and the chosen master node is arranged to determine the presence of the override condition when at least one of the response portions has already been output to the default destination node via the routing network when the update destination request is processed by the chosen master node.

9. An interconnect as claimed in claim 1, wherein:
the master node response is transmitted over the routing network as a sequence of response portions;
the chosen master node is responsive to the update destination request being processed at a time where at least one but not all of the response portions have already been output to the default destination node via the routing network, to send a first subset of the response portions to the default destination node, and to send the remaining response portions to the replacement destination node.

10. An interconnect as claimed in claim 9, wherein the chosen master node is arranged to notify the control node which response portions are within the first subset.

11. An interconnect as claimed in claim 1, wherein the control node is arranged to detect the trigger event when a further slave node request is received from the same slave node that issued the slave node request, both the slave node request and the further slave node request are seeking to access the same data, and the master node response has not yet been received for the control node request issued to service the slave node request.

12. An interconnect as claimed in claim 11, wherein:
the control node is a cache structure;
the slave node request is issued by the slave node in response to a prefetch request from prefetch circuitry of a master device coupled to that slave node, the prefetch request requesting data to be prefetched into the cache structure in anticipation of a demand request being made for that data; and
the further slave node request is issued by the slave node in response to a demand request for that data being issued by processing circuitry of the master device.

13. An interconnect as claimed in claim 11, wherein:
the further slave node request requires the data to be in a specified state, and an indication of the specified state is provided with the update destination request; and
the chosen master node is arranged to determine the presence of the override condition when the state of the data used to form the master node response is incompatible with the specified state, and in the presence of the override condition is arranged to maintain the default destination node as the destination node for the master node response.

14. An interconnect as claimed in claim 1, wherein:
the plurality of nodes comprises a plurality of slave nodes used to couple the interconnect to a first plurality of master devices in a first cluster, each of the master devices in the first plurality having a local cache structure to cache data; and
the control node comprises cache coherency circuitry to implement a cache coherency protocol.

15. An interconnect as claimed in claim 14, wherein:
the chosen master node is coupled to a further interconnect, the further interconnect being coupled to a second plurality of master devices in a second cluster, each of the master devices in the second plurality having a local cache structure to cache data;
the cache coherency circuitry is responsive to a request from a first slave node in the plurality of slave nodes to perform a snoop operation during which local snoop requests are issued to at least one master device in the first plurality, and an external snoop request is sent as the control node request to the chosen master node, to cause snoop requests to be performed by the further interconnect in respect of at least one master device in the second plurality;
wherein the cache coherency circuitry is responsive to receiving a snoop response for each local snoop request prior to the master node response being received from the chosen master node, to issue the update destination request to the chosen master node to specify the first slave node as the replacement destination node, to cause the master node response to be returned from the chosen master node to the first slave node, bypassing the cache coherency circuitry.

16. An interconnect as claimed in claim 15, wherein the master node response represents a consolidated snoop response from the master devices in the second plurality that were subjected to snoop requests as a result of the external snoop request sent to the chosen master node.

17. An interconnect as claimed in claim 15, wherein the request from the first slave node requires each master device other than the master device coupled to the first slave node to invalidate any local cached copy of the data identified by the request.

18. A method of operating an interconnect that has a plurality of nodes and a routing network via which information is routed between the plurality of nodes, comprising:
  providing within the plurality of nodes at least one slave node used to couple master devices to the interconnect, at least one master node used to couple slave devices to the interconnect, and at least one control node;
  causing each control node to be responsive to a slave node request received via the routing network from a slave node, to perform an operation to service the slave node request and, when a propagation condition is present, to issue a control node request via the routing network to a chosen master node in order to service the slave node request;
  processing the control node request at the chosen master node in order to generate a master node response, and treating as a default destination node for the master node response the control node that issued the control node request;
  responsive to a trigger event occurring after the control node request has been issued, sending from the control node an update destination request to the chosen master node, the update destination request identifying a replacement destination node for the master node response; and
  responsive to the update destination request, at least in the absence of an override condition, sending from the chosen master node the master node response via the routing network to the replacement destination node.

19. An interconnect comprising:
  a plurality of node means;
  a routing network means via which information is routed between the plurality of node means;
  the plurality of node means comprising at least one slave node means for coupling master devices to the interconnect, at least one master node means for coupling slave devices to the interconnect, and at least one control node means;
  wherein each control node means is responsive to a slave node request received via the routing network means from a slave node means, for performing an operation to service the slave node request and, when a propagation condition is present, for issuing a control node request via the routing network means to a chosen master node means in order to service the slave node request;
  the chosen master node means for processing the control node request in order to generate a master node response, and for treating as a default destination node means for the master node response the control node means that issued the control node request;
  the control node means, responsive to a trigger event occurring after the control node request has been issued, for sending an update destination request to the chosen master node means, the update destination request identifying a replacement destination node means for the master node response; and
  the chosen master node means, responsive to the update destination request, at least in the absence of an override condition, for sending the master node response via the routing network means to the replacement destination node means.

* * * * *